US011020920B2

(12) United States Patent
Slots et al.

(10) Patent No.: US 11,020,920 B2
(45) Date of Patent: Jun. 1, 2021

(54) TIRE BUILDING SYSTEM AND METHOD

(71) Applicant: VMI HOLLAND B.V., Epe (NL)

(72) Inventors: Antonie Slots, Epe (NL); Evert Doppenberg, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/622,166

(22) PCT Filed: Jun. 13, 2018

(86) PCT No.: PCT/NL2018/050383

§ 371 (c)(1), (2) Date: Dec. 12, 2019

(87) PCT Pub. No.: WO2018/231056

PCT Pub. Date: Dec. 20, 2018

(65) Prior Publication Data

US 2020/0122421 A1 Apr. 23, 2020

(30) Foreign Application Priority Data

Jun. 16, 2017 (NL) ..................................... 2019085

(51) Int. Cl.
*B29D 30/20* (2006.01)

(52) U.S. Cl.
CPC ........ *B29D 30/20* (2013.01); *B29D 2030/202* (2013.01); *B29D 2030/204* (2013.01)

(58) Field of Classification Search
CPC ........ B29D 2030/202; B29D 2030/204; B29D 30/2607; B29D 2030/105; B29D 2030/0038; B29D 30/26; B29D 2030/206
(Continued)

(56) References Cited

U.S. PATENT DOCUMENTS 3,157,542 A 11/1964 Trevaskis ...................... 156/133
9,073,276 B2 7/2015 Portinari et al. ..... B29D 30/005
(Continued)

FOREIGN PATENT DOCUMENTS

CN 101808812 8/2010 ............. B29D 30/00
DE 19918523 4/2000 ............. B29D 30/00
(Continued)

OTHER PUBLICATIONS

ESpaceNet Translation of DE19918523C1 (Year: 2020).*
(Continued)

*Primary Examiner* — Robert C Dye
*Assistant Examiner* — Alexander D Booth
(74) *Attorney, Agent, or Firm* — Hayes Soloway P.C.

(57) ABSTRACT

Disclosed is a tire building system including a first drum, a second drum and first stations, a first support, a first carrier that carries the first drum with respect to the first support, a second support and a second carrier that carries the second drum with respect to the second support, wherein the first carrier is movable along the first support in a first positioning plane, wherein the second carrier is movable along the second support in the first positioning plane, wherein the first support is arranged for supporting the first carrier from below the first positioning plane and wherein the second support is arranged for suspending the second carrier from above the first positioning plane. The disclosure further relates to a method for positioning the first drum and the second drum with respect to the first stations with the use of the aforementioned system.

28 Claims, 3 Drawing Sheets

(58) Field of Classification Search
USPC .................................................. 156/396, 111
See application file for complete search history.

(56) References Cited

U.S. PATENT DOCUMENTS

| | | | | |
|---|---|---|---|---|
| 10,220,582 | B2 | 3/2019 | Iyanagi et al. | B29D 30/005 |
| 2003/0056878 | A1 | 3/2003 | Lemaire et al. | 156/110.1 |
| 2015/0027620 | A1 | 1/2015 | Cheng et al. | B29D 30/20 |

FOREIGN PATENT DOCUMENTS

| | | | |
|---|---|---|---|
| EP | 2098360 | 9/2009 | B29D 30/20 |
| EP | 2687358 | 1/2014 | B29D 30/00 |
| EP | 2746035 | 6/2014 | B29D 30/20 |
| JP | 2000-351164 | 12/2000 | B29D 30/30 |
| JP | 2001-315219 | 11/2001 | B29D 30/30 |
| JP | 2006-001024 | 1/2006 | B29D 30/08 |
| JP | 2014-233954 | 12/2014 | D29D 30/30 |
| JP | 2015-502277 | 1/2015 | B29D 30/08 |
| WO | WO2016005852 | 1/2016 | B29D 30/20 |

OTHER PUBLICATIONS

Japanese Decision to Grant issued in Japanese Patent Application Serial No. 2019-541433, dated Jul. 22, 2020 with English translation (5 pages).

International Preliminary Report on Patentability issued in application No. PCT/NL2018/050383, dated May 14, 2019 (8 pgs).

International Search Report and Written Opinion issued in application No. PCT/NL2018/050383, dated Sep. 24, 2018 (10 pgs).

* cited by examiner

C
F
A1
1
V
X
Y
P1
S1
21
22
31
32
41
42
51
52
61
62

P2
43
53
A2
A2
S2
33
23
34
44
Y
24
X
54
T3
T4
72
71
8
T1
T2
21
51
41
S1
32
31
22
42
5
P1
A1

TIRE BUILDING SYSTEM AND METHOD

BACKGROUND

The invention relates to a tire building system and method for positioning drums with respect to a plurality of stations.

EP 2 746 035 A1 discloses a tire building system comprising two loops of travel track and a plurality of carriage housings movably mounted to each travel track. The carriage housings comprise full-stage tire building drums and breaker and tread drums. The tire building system further includes a plurality of fixed component application stations associated with each of the loops. The system is designed such that carriage housings travelling along the loops serially engage the fixed application stations and receive a component at each fixed application station.

EP 2 687 358 B1 discloses a method for manufacturing vehicle tires, in which a plurality of belt drums are moved sequentially along a rectangular or circular trajectory from a starting position through a plurality of further positions. At each position, a station is provided for performing tire building operations such as winding-up a material ply or forming treads.

An inherent disadvantage of the known tire building system and the known method is that some tire building operations may take longer to complete than others. Hence, one station may already be finished while another station is still completing its tire building operation. The drums cannot be advanced further until the slowest tire building operation has been completed. The efficiency of the entire tire building system is thus dependent on its slowest station.

It is an object of the present invention to provide a tire building system and method for positioning a plurality of movable drums with respect to a plurality of stations, wherein the efficiency of the tire building can be improved.

SUMMARY OF THE INVENTION

According to a first aspect, the invention relates to a tire building system comprising a first drum, a second drum and a plurality of first stations for performing tire building operations on said first drum and said second drum, wherein the tire building system further comprises a first support, a first carrier that carries the first drum with respect to the first support, a second support and a second carrier that carries the second drum with respect to the second support, wherein the first carrier is movable along the first support in a first positioning plane to position the first drum with respect to the plurality of first stations, wherein the second carrier is movable along the second support in the same first positioning plane to position the second drum with respect to the plurality of first stations, wherein the first support is arranged for supporting the first carrier from below the first positioning plane and wherein the second support is arranged for suspending the second carrier from above the first positioning plane.

It will be clear from the application as a whole that 'from below' and 'from above' in relation to the first positioning plane is to be interpreted as a direction transverse or perpendicular to said first positioning plane.

By supporting the first drum and suspending the second drum from different levels, e.g. from below the first positioning plane and from above the first positioning plane, the first drum and the second drum can more easily pass each other. Hence, the first drum and the second drum can be moved in the same positioning plane and can visit any station that is not occupied by the other drum without obstructing and/or interfering with the operation of the other drum. Consequently, the first drum and the second drum do not have to wait on each other tire building operations to finish and can move independently of each other to any one of the stations to make more efficient use of said stations according to the recipe of the tire component that is to be built on said respective drum.

The problem solved by the invention is how to improve the efficiency of the tire building in a tire building system for positioning a plurality of drums with respect to a plurality of stations. EP 2 746 035 A1 discloses a plurality of movable drums which are all being suspended from above. EP 2 687 358 B1 discloses a plurality of movable drums which are all being supported from below. WO 2016/005852 A1 discloses a single movable drum supported from above by an XYZ manipulator. However, WO 2016/005852 A1 is merely aimed at positioning said single movable drum with respect to a plurality of servicers. WO 2016/005852 A1 does not hint nor suggest that it provides a solution for improving the efficiency of a tire building system for positioning a plurality of movable drums with respect to a plurality of stations. The XYZ manipulator is clearly incompatible with the track systems as disclosed in EP 2 746 035 A1 and EP 2 687 358 B1. It is the enlightenment of the present invention that the movable drums in a tire building system can be supported/suspended individually in different way while still being able to move in the same area and/or to any or all of the same first stations that has allowed for a considerable improvement in efficiency.

In a preferred embodiment the first carrier and the first drum are arranged for in the first positioning plane crossing under the second support. Hence, the second support does not block the said movement of the first carrier and the first drum. The first drum can thus be moved from one side of the second support to an opposite side of the second support while remaining in the first positioning plane.

In another preferred embodiment the second carrier and the second drum are arranged for in the first positioning plane crossing over the first support. Hence, the first support does not block the said movement of the second carrier and the second drum. The second drum can thus be moved from one side of the first support to an opposite side of the first support while remaining in the first positioning plane.

In a further embodiment the first carrier is movable in a first direction parallel to the first positioning plane, wherein the second carrier is movable in the same first direction. More preferably, the first carrier is movable in a second direction parallel to the first positioning plane and transverse or perpendicular to the first direction, wherein the second carrier is movable in the same second direction. The first carrier and the second carrier can therefore be moved in the same directions without interfering with each other.

In another embodiment the first carrier is movable along the first support to any first station of the plurality of first stations not occupied by the second drum, wherein the second carrier is movable along the second support to any first station of the plurality of first stations not occupied by the first drum. Hence, the second drum can visit any one or all of the first stations that can be visited by the first drum and the first drum can visit any one or all of the first stations that can be visited by the second drum. The only limitation is that the one of the drums cannot visit one of the first stations that is at that moment in time occupied by the other drum.

In a further embodiment the tire building system comprises a positioning unit for controlling the positioning of the first drum and the second drum, wherein the positioning unit is programmed to prevent collision between the first drum and the second drum. For example, the positioning unit may be arranged for calculating the trajectories followed by the first drum and the second drum such that the first drum and the second drum do not collide. Alternatively, the first drum and the second drum may be controlled manually through the positioning unit by an operator, in which case the positioning unit may not accept an instruction from the operator that would result in a collision between the first drum and the second drum.

In an embodiment thereof the positioning unit is arranged to be programmed with a first safety zone that is occupied by the first drum and a second safety zone that is occupied by the second drum, wherein the positioning unit is arranged for controlling the positioning of the first drum and the second drum such that the first safety zone and the second safety zone do not overlap. Each safety zone may include a margin around the contour of the first drum or the second drum that is to be kept free from the safety zone of the other drum to not only prevent collision, but also to prevent close proximity of the drums with respect to each other.

In a further embodiment thereof at least one of the first drum and the second drum is provided with one or more sensors for detecting the proximity of the other of the first drum and the second drum, wherein the positioning unit is operationally connected to the one or more sensors and is arranged for controlling the positioning of first drum and the second drum based on signals received from said one or more sensors. By providing one or more sensors, the position control can be operated automatically and/or autonomously.

In another embodiment the tire building system comprises first control lines and second control lines for mechanically, hydraulically, pneumatically, electrically and/or electronically controlling the first drum and the second drum, respectively, wherein the first control lines are guided from above the first positioning plane to the first drum and wherein the second control lines are guided from below the first positioning plane to the second drum. By directing the control lines separately from different sides of the first positioning plane to the drums, it can be prevented that said control lines interfere with the operation and/or movement of the drums with respect to each other.

To the extent that 'from below' and 'from above' the first positioning plane needs to be clarified, it is noted that in a preferred embodiment the first support is arranged for supporting the first carrier in a direction transverse or perpendicular to the first positioning plane from below the first positioning plane and wherein the second support is arranged for suspending the second carrier in a direction transverse or perpendicular to the first positioning plane from above the first positioning plane.

In another embodiment, the first support and the second support are located outside of the first positioning plane. Hence, the first drum can be supported and the second drum can be suspended from different levels, said levels not being at the level of the first positioning plane.

Preferably, the first positioning plane is horizontal or substantially horizontal. Hence, the first carrier and the second carrier can be moved horizontally with their respective drums operating in the same first positioning plane while being supported independently of each other from below the horizontal first positioning plane and being suspended from above the horizontal first positioning plane, respectively.

In further embodiment the first drum, the second drum and the plurality of first stations are located in a first tire building area, wherein the tire building system comprises a second tire building area with a third drum, a fourth drum and a plurality of second stations for performing tire building operations on said third drum and said fourth drum, wherein the tire building system further comprises one or more transfer members for transferring tire components between the first tire building area and the second tire building area. Said tire building areas may have the same or different functionalities. For example, the first tire building area may be dedicated to building a belt and tread package while the other tire building area may be arranged for simultaneously building a carcass.

In an embodiment thereof the tire building system comprises a third support, a third carrier that carries the third drum with respect to the third support, a fourth support and a fourth carrier that carries the fourth drum with respect to the fourth support, wherein the third carrier is movable along the third support in a second positioning plane to position the third drum with respect to the plurality of second stations, wherein the fourth carrier is movable along the fourth support in the same second positioning plane to position the fourth drum with respect to the plurality of second stations, wherein the third support is arranged for supporting the third carrier from below the second positioning plane and wherein the fourth support is arranged for suspending the fourth carrier from above the second positioning plane. Hence, the third drum and the fourth drum can be moved independently of each other to any one of the second stations in the same way that the first drum and the second drum can be moved independently of each other to any one or all of the first stations. The same technical advantages as described before in relation to the first drum and the second drum apply here as well.

In a further embodiment thereof the second positioning plane is parallel to or coplanar with the first positioning plane. Hence, the first drum, the second drum, the third drum and the fourth drum can be moved in coplanar positioning planes, thus facilitating a transfer at one of the one or more transfer members.

According to a second aspect, the invention relates to a method for positioning a first drum and a second drum with respect to a plurality of first stations with the use of the aforementioned tire building system, wherein the method comprises the steps of: moving the first carrier along the first support in the first positioning plane to position the first drum with respect to the plurality of first stations; and moving the second carrier along the second support in the same first positioning plane to position the second drum with respect to the plurality of first stations; wherein the first support supports the first carrier from below the first positioning plane and wherein the second support suspends the second carrier from above the first positioning plane.

The method relates to the use of the aforementioned tire building system and its embodiments. Hence, the method and its corresponding embodiments have the same technical advantages which will not be repeated hereafter.

In a preferred embodiment of the method, the first carrier and the first drum in the first positioning plane cross under the second support.

In a further preferred embodiment of the method, the second carrier and the second drum in the first positioning plane cross over the first support.

In a further embodiment the method comprises the steps of moving the first carrier in a first direction parallel to the first positioning plane and moving the second carrier in the same first direction.

In an embodiment thereof the method further comprises the steps of moving the first carrier in a second direction parallel to the first positioning plane and transverse or perpendicular to the first direction and moving the second carrier in the same second direction.

In another embodiment the method further comprises the steps of: defining a first safety zone that is occupied by the first drum and a second safety zone that is occupied by the second drum; and positioning the first drum and the second drum such that the first safety zone and the second safety zone do not overlap.

To the extent that 'from below' and 'from above' the first positioning plane needs to be clarified, it is noted that in a preferred embodiment the first support supports the first carrier in a direction transverse or perpendicular to the first positioning plane from below the first positioning plane and wherein the second support suspends the second carrier in a direction transverse or perpendicular to the first positioning plane from above the first positioning plane.

In another embodiment the first support and the second support are located outside of the first positioning plane.

Preferably, the first positioning plane is horizontal or substantially horizontal.

In a further embodiment of the method, the first drum, the second drum and the plurality of first stations are located in a first tire building area, wherein the tire building system comprises a second tire building area with a third drum, a fourth drum and a plurality of second stations for performing tire building operations on said third drum and said fourth drum, wherein the method comprises the step of transferring tire components between the first tire building area and the second tire building area.

In an embodiment thereof the tire building system comprises a third support, a third carrier that carries the third drum with respect to the third support, a fourth support and a fourth carrier that carries the fourth drum with respect to the fourth support, wherein the method further comprises the steps of: moving the third carrier along the third support in a second positioning plane to position the third drum with respect to the plurality of second stations; and moving the fourth carrier along the fourth support in the same second positioning plane to position the fourth drum with respect to the plurality of second stations; wherein the third support supports the third carrier from below the second positioning plane and wherein the fourth support suspends the fourth carrier from above the second positioning plane.

In another embodiment the method comprises the step of moving one of the first drum and the second drum into a parking zone, wherein the location of the parking zone is chosen such that the other of the first drum and the second drum can be moved to all of the first stations without being obstructed by the drum in the parking zone.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
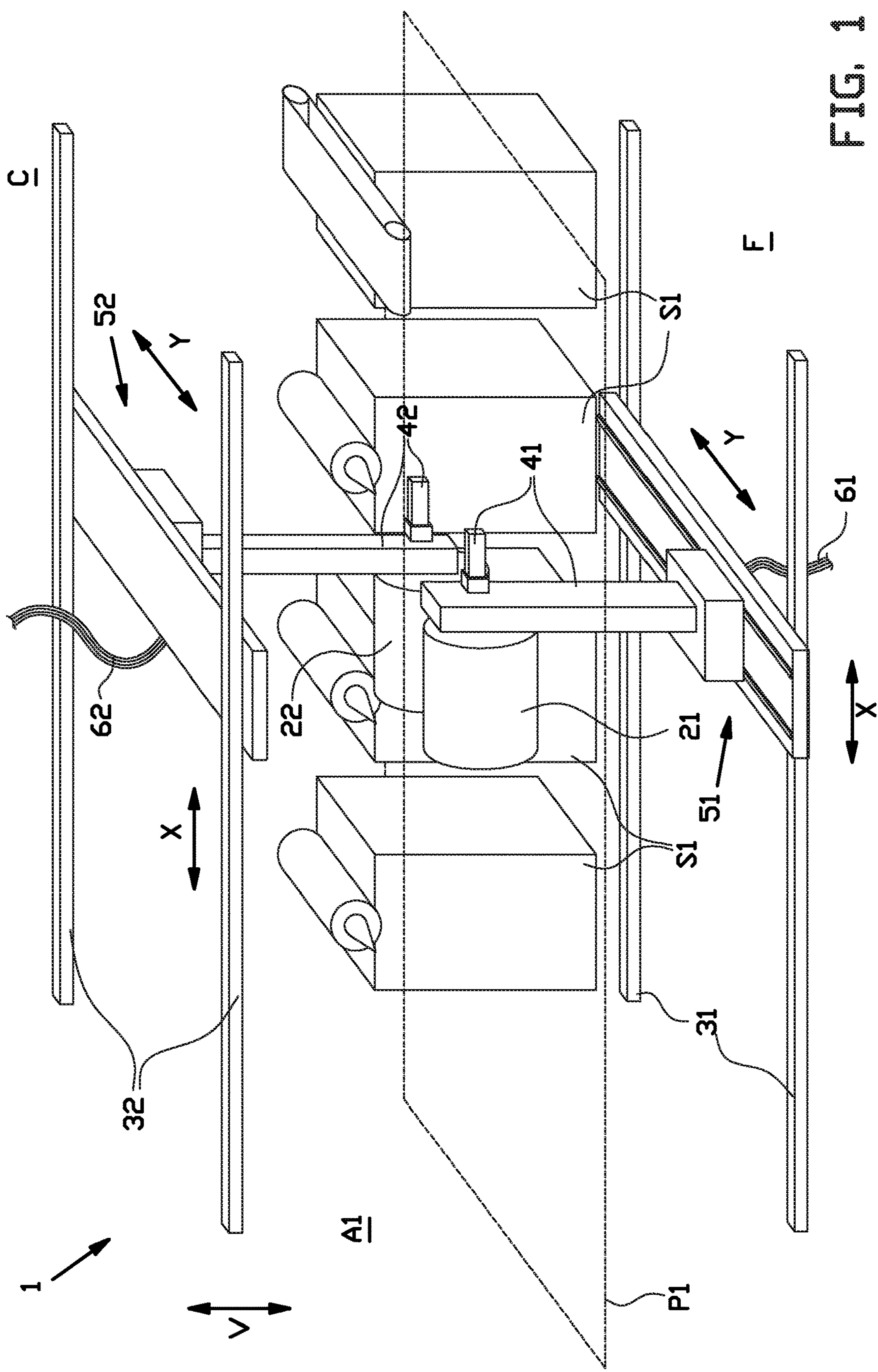
FIG. 1 shows an isometric view of a first tire building area of a tire building system with a first drum, a second drum and a plurality of first stations for performing tire building operations on said first drum and said second drum.
Figure 2:
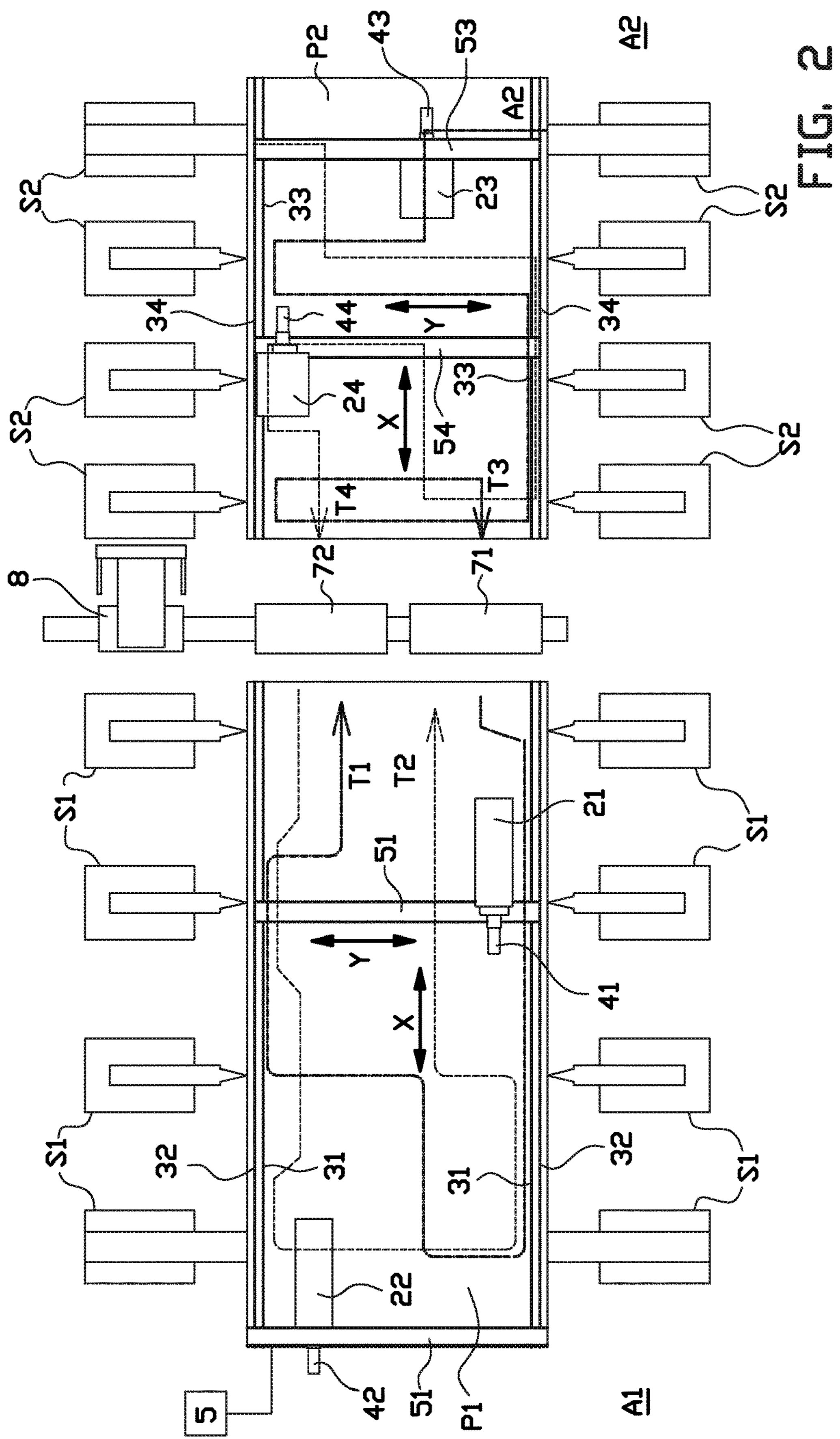
FIG. 2 shows a top view of the tire building system of FIG. 1, including a second tire building area with a third drum, a fourth drum and a plurality of second stations for performing tire building operations on said third drum and said fourth drum.

FIGS. 1 and 2 show a tire building system 1 according to an exemplary embodiment of the invention.

As shown in FIGS. 1 and 2, the tire building system 1 comprises a first tire building area A1 with a first drum 21, a second drum 22 and a plurality of first stations S1 for performing tire building operations on said first drum 21 and said second drum 22. As shown in FIG. 2, the tire building system 1 may optionally comprise a second tire building area A2 with a third drum 23, a fourth drum 24 and a plurality of second stations S2. At each station, the tire building system 1 is provided with an applicator for applying one or more tire components to one of the drums 21-24. The applicator may be one of the group comprising a servicer, a component maker, a strip winding unit or a transfer device. The number of first stations S1 and/or second stations S2 may conveniently be chosen differently to suit different tire building needs. The stations S1, S2 can have different functions or the same function with different parameters.

As best seen in FIG. 1, the tire building system 1 comprises a first support 31 for supporting the first drum 21 with respect to a ground or a floor F. Essentially, the first drum 21 can be considered as a drum that 'stands' on the floor F. In this exemplary embodiment, the first support 31 is formed by two rails extending mutually parallel in a first direction X on the floor F. The rails may be fixedly mounted or connected to the floor F. The tire building system 1 further comprises a first housing, carriage or carrier 41 that carries the first drum 21 with respect to the first support 31. The first carrier 41 is movable over, along or with respect to the first support 31 in a first positioning plane P1 to position the first drum 21 with respect to any one of the plurality of first stations S1. The first support 31 is located outside the first positioning plane P1. In other words, the first support 31 does not cross or intersect with the first positioning plane P1. More in particular, the first support 31 is located below and spaced apart from the first positioning plane P1 in a direction transverse or perpendicular to the first positioning plane P.

The tire building system 1 further comprises a second support 32 for supporting or suspending the second drum 22 from the ceiling C or a structure spaced apart from the floor F in a similar way as a ceiling. In this exemplary embodiment, the second support 32 is formed by two rails extending mutually parallel in the first direction X along the ceiling C and/or spaced apart from the floor F. The tire building system 1 comprises a second housing, carriage or carrier 42 that carries the second drum 22 with respect to the second support 32. In particular, the second carrier 42 is movable along the second support 32 in the same first positioning plane P1 as the first drum 21 to position the second drum 22 with respect to any one of the plurality of first stations S1. Essentially, the second drum 22 can be considered as a drum that 'hangs' from the ceiling C. The second support 32 is located outside the first positioning plane P1. In other words, the second support 32 does not cross or intersect with the first positioning plane P1. More in particular, the second support 32 is located above and spaced apart from the first positioning plane P1 in a direction transverse or perpendicular to the first positioning plane P.

Both the first carrier 41 and the second carrier 42 are independently movable in a first direction X parallel to the first positioning plane P1. The first carrier 41 and the second carrier 42 are additionally independently movable in a second direction Y parallel to the first positioning plane P1 and transverse or perpendicular to the first direction X. The first positioning plane P1 is preferably horizontal or substantially horizontal. Hence, the first direction X and the second direction Y are horizontal directions. In particular, the first direction X and the second direction Y are parallel to the two horizontally extending, mutually orthogonal axes of an XYZ coordinate system. The direction transverse or perpendicular to the first positioning plane P1 is a vertical direction V. Preferably, the first carrier 41 and the second carrier 42 are each movably connected to the first support 31 and the second support 32, respectively, through respective XY-drives 51, 52.

As schematically shown in FIG. 2, the first carrier 41 and the first drum 21 carried by said first carrier 41 can be moved to any position within the first positioning plane P that is not occupied by the second drum 22. Similarly, the second carrier 42 and the second drum 22 carried by said second carrier 42 can be moved to any position within the first positioning plane P that is not occupied by the first drum 21.

FIG. 2 shows a possible first trajectory T1 to be followed by the first carrier 41 and a second trajectory T2 to be followed by the second carrier 42. It is noted that these trajectories can be chosen randomly. The first drum 21 and the second drum 22 may be moved along the different first stations S1 in any order or sequence according to its own recipe and/or independently from the other drum(s) 21, 22. When the first drum 21 and the second drum 22 have to pass each other in the first direction X, the operator can simply position the first drum 21 and the second drum 22 so that they are spaced apart in the second direction Y. The spaced apart first drum 21 and second drum 22 can subsequently pass each other. During such passing, the first carrier 41 and the first drum 21 are arranged for in the first positioning plane P1 crossing under the second support 32. Simultaneously, the second carrier 42 and the second drum 22 are arranged for in the first positioning plane P1 crossing over the first support 31.

In summary, the first support 31 is arranged for supporting the first carrier 41 from below the first positioning plane P1 and the second support 32 is arranged for supporting or suspending the second carrier 42 from above the first positioning plane P1. It will be clear from the application as a whole that 'from below' and 'from above' in relation to the first positioning plane P1 is to be interpreted as a direction transverse or perpendicular to said first positioning plane P1, e.g. the vertical direction V as shown in FIG. 1. This provides the technical advantage that the first carrier 41 can be moved independently of the second support 32 underneath said second support 32 and that the second carrier 42 can be moved independently of the first support 31 over said first support 31. More in particular, when the first drum 21 and the second drum 22 are supported solely by the first carrier 41 and the second carrier 42, respectively, they are able to pass each other in the first positioning plane P1 independently of the support members 31, 32 extending below and above said first positioning plane P1.

As schematically shown in FIG. 1, the tire building system 1 comprises first control lines 61 and second control lines 62 for mechanically, hydraulically, pneumatically, electrically and/or electronically controlling the first drum 21 and the second drum 22, respectively. The first control lines 61 are guided from above the first positioning plane P1 to the first drum 21 and wherein the second control lines 62 are guided from below the first positioning plane P1 to the second drum 22. Hence, the first control lines 61 associated with the first drum 21 can be kept completely free from the second control lines 62 associated with the second drum 22.

Figure 3:
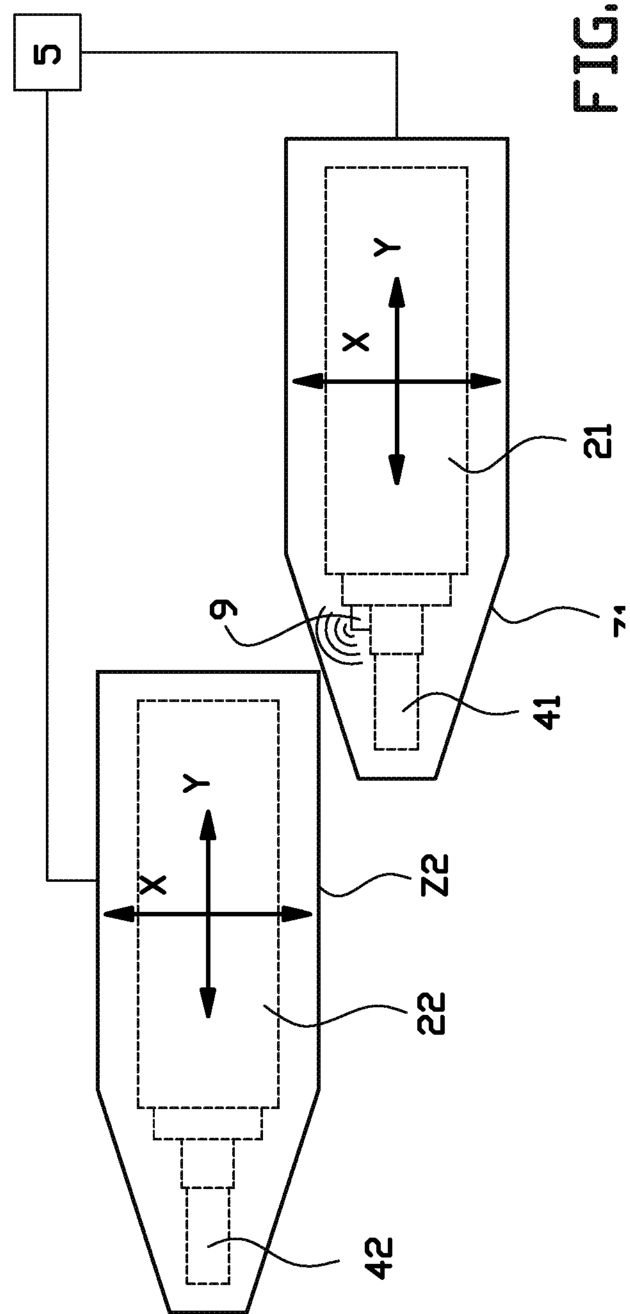
FIG. 3 shows a top view of the first drum and the second drum during control of the positioning of said first drum and said second drum.

As schematically shown in FIGS. 1 and 2, the tire building system 1 is provided with a positioning unit 5 that is operationally connected to the first drum 21, the second drum 22 and their respective XY drives 51, 52 for controlling the positioning of the first drum 21 and the second drum 22. Said positioning unit 5 is programmed to prevent collision between the first drum 21 and the second drum 22. As shown in FIG. 3, the positioning unit 5 may for example be programmed with a first safety zone Z1 that is occupied by the first drum 21 and a second safety zone Z2 that is occupied by the second drum 22. The positioning unit 5 is then arranged for controlling the positioning of the first drum 21 and the second drum 22 such that the first safety zone Z1 and the second safety zone Z2 do not overlap. Additionally or alternatively, at least one of the first drum 21 and the second drum 22 can be provided with one or more sensors 9 for detecting the proximity of the other of the first drum 21 and the second drum 22. In the latter case, the positioning unit 5 is operationally connected to the one or more sensors 9 and is arranged for controlling the positioning of first drum 21 and the second drum 22 based on signals received from said one or more sensors 9.

Optionally, each tire building area A1, A2 may be provided with a parking zone (not shown) for parking one of the drums 21, 22 while the other of the drums 21, 22 remains active. The location of the parking zone is chosen such that the active drum 21, 22 can move to all of the stations S1, S2 in said tire building area A1, A2 without obstruction by the inactive drum 21, 22 in the parking zone. Said parking zone may be accessible by an operator to perform maintenance on the inactive drum 21, 22 without the hazard of the active drum 21, 22 entering the parking zone. Hence, the tire building system 1 can at least partially remain operational, even during maintenance.

As shown in FIG. 2, the third drum 23 and the fourth drum 24 are movable independently of each other in the same way that the first drum 21 and the second drum 22 move independently of each other. In particular, the tire building system 1 comprises a third support 33, a third housing, carriage or carrier 43 that carries the third drum 23 with respect to the third support 33, a fourth support 34 and a fourth housing, carriage or carrier 44 that carries the fourth drum 24 with respect to the fourth support 34. The third carrier 43 is movable along the third support 33 in a second positioning plane P2 to position the third drum 23 with respect to the plurality of second stations S2. Preferably, the second positioning plane P2 is parallel to or coplanar with the first positioning plane P1. The fourth carrier 44 is movable along the fourth support 34 in the same second positioning plane P2 to position the fourth drum 24 with respect to the plurality of second stations S2. Both the third carrier 43 and the fourth carrier 44 are movable in the first direction X. The third carrier 43 and the fourth carrier 44 are additionally movable in the second direction Y. Preferably, the third carrier 43 and the fourth carrier 44 are each movably connected to the third support 33 and the fourth support 34, respectively, through respective XY-drives 53, 54.

Similar to the first support 31 and the second support 32, the third support 33 is arranged for supporting the third carrier 43 from below the second positioning plane P2 while the fourth support 34 is arranged for supporting or suspending the fourth carrier 44 from above the second positioning plane P2.

FIG. 2 shows a possible third trajectory T3 to be followed by the third carrier 43 and a fourth trajectory T4 to be followed by the fourth carrier 44. Again, these trajectories can be chosen randomly. The third drum 23 and the fourth drum 24 may be moved along the different second stations S2 in any order or sequence according to its own recipe and/or independently from the other drum(s) 23, 24. The third carrier 43 and the third drum 23 are arranged for in the second positioning plane P2 crossing under the fourth support 34. Simultaneously, the fourth carrier 44 and the fourth drum 24 are arranged for in the second positioning plane P2 crossing over the third support 33.

The tire building system 1 further comprises one or more transfer members 71, 72 for transferring tire components between the first tire building area A1 and the second tire building area A2. The transfer members 71, 72 are preferably formed by one or more transfer rings. Additionally, the tire building system 1 may comprise a tire removal member 8 for receiving and discharging a finished or semi-finished tire from the first tire building area A1 or the second tire building area A2.

As a result of the increased flexibility of the tire building system 1 according to the invention the tire building system 1 can be used for single stage as well as multi-stage tire building, for carcass building, for building belt and tread packages, for shaping and/or for virtually any other tire building operations involving drums. Different tire can be built simultaneously or sequentially without changing settings at the drums 21-24 or the stations S1, S2.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A tire building system comprising a first drum, a second drum and a plurality of first stations for performing tire building operations on said first drum and said second drum, wherein the tire building system further comprises a first support, a first carrier that carries the first drum with respect to the first support, a second support and a second carrier that carries the second drum with respect to the second support, wherein the first carrier is movable along the first support in a first positioning plane to position the first drum with respect to the plurality of first stations, wherein the second carrier is movable along the second support in the same first positioning plane to position the second drum with respect to the plurality of first stations, wherein the first support is arranged for supporting the first carrier from below the first positioning plane and wherein the second support is arranged for suspending the second carrier from above the first positioning plane.

2. The tire building system according to claim 1, wherein the first carrier and the first drum are arranged for in the first positioning plane crossing under the second support.

3. The tire building system according to claim 1, wherein the second carrier and the second drum are arranged for in the first positioning plane crossing over the first support.

4. The tire building system according to claim 1, wherein the first carrier is movable in a first direction parallel to the first positioning plane, wherein the second carrier is movable in the same first direction.

5. The tire building system according to claim 4, wherein the first carrier is movable in a second direction parallel to the first positioning plane and transverse or perpendicular to the first direction, wherein the second carrier is movable in the same second direction.

6. The tire building system according to claim 1, wherein the first carrier is movable along the first support to any first station of the plurality of first stations not occupied by the second drum, wherein the second carrier is movable along the second support to any first station of the plurality of first stations not occupied by the first drum.

7. The tire building system according to claim 1, wherein the tire building system comprises a positioning unit for controlling the positioning of the first drum and the second drum, wherein the positioning unit is programmed to prevent collision between the first drum and the second drum.

8. The tire building system according to claim 7, wherein the positioning unit is arranged to be programmed with a first safety zone that is occupied by the first drum and a second safety zone that is occupied by the second drum, wherein the positioning unit is arranged for controlling the positioning of the first drum and the second drum such that the first safety zone and the second safety zone do not overlap.

9. The tire building system according to claim 7, wherein at least one of the first drum and the second drum is provided with one or more sensors for detecting the proximity of the other of the first drum and the second drum, wherein the positioning unit is operationally connected to the one or more sensors and is arranged for controlling the positioning of first drum and the second drum based on signals received from said one or more sensors.

10. The tire building system according to claim 1, wherein the tire building system comprises first control lines and second control lines for mechanically, hydraulically, pneumatically, electrically or electronically controlling the first drum and the second drum, respectively, wherein the first control lines are guided from below the first positioning plane to the first drum and wherein the second control lines are guided from above the first positioning plane to the second drum.

11. The tire building system according to claim 1, wherein the first support is arranged for supporting the first carrier in a direction transverse or perpendicular to the first positioning plane from below the first positioning plane and wherein the second support is arranged for suspending the second carrier in a direction transverse or perpendicular to the first positioning plane from above the first positioning plane.

12. The tire building system according to claim 1, wherein the first support and the second support are located outside of the first positioning plane.

13. The tire building system according to claim 1, wherein the first positioning plane is horizontal.

14. The tire building system according to claim 1, wherein the first drum, the second drum and the plurality of first stations are located in a first tire building area, wherein the tire building system comprises a second tire building area with a third drum, a fourth drum and a plurality of second stations for performing tire building operations on said third drum and said fourth drum, wherein the tire building system further comprises one or more transfer members for transferring tire components between the first tire building area and the second tire building area.

15. The tire building system according to claim 14, wherein the tire building system comprises a third support, a third carrier that carries the third drum with respect to the third support, a fourth support and a fourth carrier that carries the fourth drum with respect to the fourth support, wherein the third carrier is movable along the third support in a second positioning plane to position the third drum with respect to the plurality of second stations, wherein the fourth carrier is movable along the fourth support in the same second positioning plane to position the fourth drum with respect to the plurality of second stations, wherein the third support is arranged for supporting the third carrier from below the second positioning plane and wherein the fourth support is arranged for suspending the fourth carrier from above the second positioning plane.

16. The tire building system according to claim 15, wherein the second positioning plane is parallel to or coplanar with the first positioning plane.

17. A method for positioning a first drum and a second drum with respect to a plurality of first stations with the use of the tire building system according to claim 1, wherein the method comprises the steps of: moving the first carrier along the first support in the first positioning plane to position the first drum with respect to the plurality of first stations; and moving the second carrier along the second support in the same first positioning plane to position the second drum with respect to the plurality of first stations; wherein the first support supports the first carrier from below the first positioning plane and wherein the second support suspends the second carrier from above the first positioning plane.

18. The method according to claim 17, wherein the first carrier and the first drum in the first positioning plane cross under the second support.

19. The method according to claim 17, wherein the second carrier and the second drum in the first positioning plane cross over the first support.

20. The method according to claim 17, wherein the method comprises the steps of moving the first carrier in a first direction parallel to the first positioning plane and moving the second carrier in the same first direction.

21. The method according to claim 20, wherein the method further comprises the steps of moving the first carrier in a second direction parallel to the first positioning plane and transverse or perpendicular to the first direction and moving the second carrier in the same second direction.

22. The method according to claim 17, wherein the method further comprises the steps of: defining a first safety zone that is occupied by the first drum and a second safety zone that is occupied by the second drum; and positioning the first drum and the second drum such that the first safety zone and the second safety zone do not overlap.

23. The method according to claim 17, wherein the first support supports the first carrier in a direction transverse or perpendicular to the first positioning plane from below the first positioning plane and wherein the second support suspends the second carrier in a direction transverse or perpendicular to the first positioning plane from above the first positioning plane.

24. The method according to claim 17, wherein the first support and the second support are located outside of the first positioning plane.

25. The method according to claim 17, wherein the first positioning plane is horizontal.

26. The method according to claim 17, wherein the first drum, the second drum and the plurality of first stations are located in a first tire building area, wherein the tire building system comprises a second tire building area with a third drum, a fourth drum and a plurality of second stations for performing tire building operations on said third drum and said fourth drum, wherein the method comprises the step of transferring tire components between the first tire building area and the second tire building area.

27. The method according to claim 26, wherein the tire building system comprises a third support, a third carrier that carries the third drum with respect to the third support, a fourth support and a fourth carrier that carries the fourth drum with respect to the fourth support, wherein the method further comprises the steps of moving the third carrier along the third support in a second positioning plane to position the third drum with respect to the plurality of second stations; and moving the fourth carrier along the fourth support in the same second positioning plane to position the fourth drum with respect to the plurality of second stations; wherein the third support supports the third carrier from below the second positioning plane and wherein the fourth support suspends the fourth carrier from above the second positioning plane.

28. The method according to claim 17, wherein the method comprises the step of moving one of the first drum and the second drum into a parking zone, wherein the location of the parking zone is chosen such that the other of the first drum and the second drum can be moved to all of the first stations without being obstructed by the drum in the parking zone.

* * * * *